United States Patent
Shiizaki et al.

(10) Patent No.: US 8,559,356 B2
(45) Date of Patent: Oct. 15, 2013

(54) WIRELESS RELAY DEVICE, WIRELESS RELAY METHOD, AND WIRELESS COMMUNICATION SYSTEM

(75) Inventors: Kotaro Shiizaki, Kawasaki (JP); Masafumi Tsutsui, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 12/789,023

(22) Filed: May 27, 2010

(65) Prior Publication Data

US 2010/0303000 A1 Dec. 2, 2010

(30) Foreign Application Priority Data

Jun. 1, 2009 (JP) .................................. 2009-131994

(51) Int. Cl.
- H04B 7/14 (2006.01)
- H04B 7/185 (2006.01)
- H04W 4/00 (2009.01)

(52) U.S. Cl.
USPC ............ 370/315; 370/318; 370/328; 370/392

(58) Field of Classification Search
None
See application file for complete search history.

(56) References Cited

U.S. PATENT DOCUMENTS

| | | | |
|---|---|---|---|
| 2005/0025085 A1* | 2/2005 | King | 370/315 |
| 2005/0272456 A1 | 12/2005 | Yoshii et al. | |
| 2007/0275656 A1* | 11/2007 | Chang et al. | 455/9 |
| 2007/0275657 A1* | 11/2007 | Chang et al. | 455/9 |
| 2008/0108304 A1 | 5/2008 | Suga | |
| 2008/0242339 A1* | 10/2008 | Anderson | 455/522 |
| 2009/0017814 A1 | 1/2009 | Horiuchi et al. | |
| 2010/0265839 A1* | 10/2010 | Almgren et al. | 370/252 |

FOREIGN PATENT DOCUMENTS

| | | |
|---|---|---|
| JP | 10-13338 | 1/1998 |
| JP | 2004-208153 | 7/2004 |
| JP | 2006-165623 | 6/2006 |
| JP | 2008-118499 | 5/2008 |
| WO | 2006-090669 | 8/2006 |

OTHER PUBLICATIONS

"Cell Edge Performance for Amplify and Forward vs. Decode and Forward Relays", Jan. 12-16, 2009, Nokia Siemens Networks, Nokia, Ljubljana, Slovenia.
Notification of Reasons for Refusal dated May 28, 2013, from corresponding Japanese Application No. 2009-131994.

* cited by examiner

Primary Examiner — Yemane Mesfin
Assistant Examiner — Christine Duong
(74) Attorney, Agent, or Firm — Katten Muchin Rosenman LLP

(57) ABSTRACT

A wireless relay device that transmits a reception signal from a transmission device to a reception device includes a determination section configured to determine whether or not the reception signal is a retransmission signal retransmitted from the transmission device, and an amplification section configured to amplify the reception signal when the determination section determines that the reception signal is the retransmission signal, and not to amplify the reception signal when the determination section determines that the reception signal is not the retransmission signal.

14 Claims, 15 Drawing Sheets

WIRELESS RELAY DEVICE, WIRELESS RELAY METHOD, AND WIRELESS COMMUNICATION SYSTEM

CROSS-REFERENCE TO RELATED APPLICATIONS

This application is based upon and claims the benefit of priority of the prior Japanese Patent Application No. 2009-131994, filed on Jun. 1, 2009, the entire contents of which are incorporated herein by reference.

FIELD

The present invention relates to a wireless relay device, a wireless relay method, and a wireless communication system.

BACKGROUND

There has been provided a wireless communication system that utilizes a wireless relay device or a relay station (RS). The utilization of the wireless relay device may cause, for example, the throughput or the like of a terminal device (user equipment: UE) which is located near a cell edge to be improved.

As a relay method used for a wireless relay device, there are two kinds of methods, an amplify and forward (AF) method and a decode and forward (DF) method (for example, 3GPP R1-090243 "Cell Edge Performance for Amplify and Forward vs. Decode and Forward Relays", Nokia Siemens Network, Nokia).

In the AF method, a wireless relay device amplifies signals, received from a base station (BS) and a terminal device, and transmits the amplified signals to the terminal device and the base station, respectively.

In addition, in the DF method, a wireless relay device demodulates and decodes signals, received from a base station (BS) and a terminal device, performs error correction or the like if an error occurs, encodes and modulates the signals again, and, after performing amplification, transmits the signals to the terminal device and the base station, respectively.

In addition, in the related art, a wireless relay device is also disclosed, for example, in Japanese Laid-Open Patent Publication No. 2008-118499.

However, the wireless relay device of the related art amplifies and transmits a received signal independently of the AF method and the DF method. Since the wireless relay device performs power amplification, the power consumption of the wireless relay device may increase.

In addition, since the wireless relay device performs demodulation or the like in the DF method, a large processing delay may occur, compared with the AF method.

SUMMARY

According to an aspect of the invention, a wireless relay device that transmits a reception signal from a transmission device to a reception device includes a determination section configured to determine whether or not the reception signal is a retransmission signal retransmitted from the transmission device, and an amplification section configured to amplify the reception signal when the determination section determines that the reception signal is the retransmission signal, and not to amplify the reception signal when the determination section determines that the reception signal is not the retransmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment of the present invention will be described.

<First Embodiment>

Figure 1:
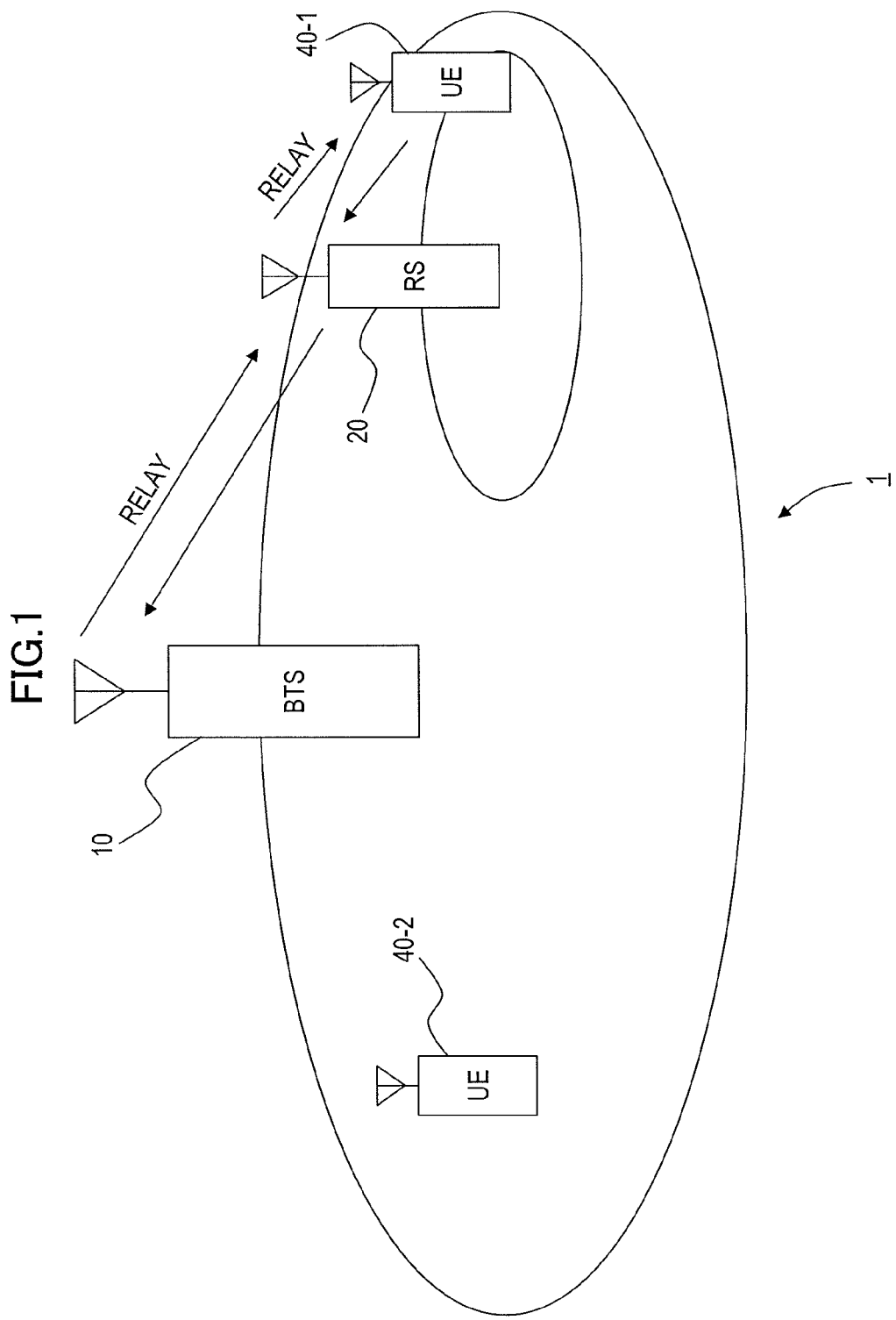
FIG. 1 is a diagram illustrating an example of a wireless communication system.

A first embodiment will be described. FIG. 1 is a diagram illustrating an example of a wireless communication system 1. The wireless communication system 1 includes a base transceiver station (BTS) (referred to as base station, hereinafter) 10, a wireless relay device (referred to as relay station or "RS", hereinafter) 20, and terminal devices (referred to as terminals or user equipment "UE", hereinafter) 40-1 and 40-2.

The base station 10 performs wireless communication with the terminals 40-1 and 40-2. In the example illustrated in FIG. 1, the base station 10 performs wireless communication with the terminal 40-1 through the relay station 20. Since the relay station 20 is provided, the wireless communication system 1 may extend a coverage range with respect to a wireless-communication-capable range (or cell range) of the base station 10.

In addition, since the relay station 20 amplifies a wireless signal, the wireless communication system 1 may improve throughput with respect to a signal received by the terminal 40-1 or the base station 10.

Figure 2:
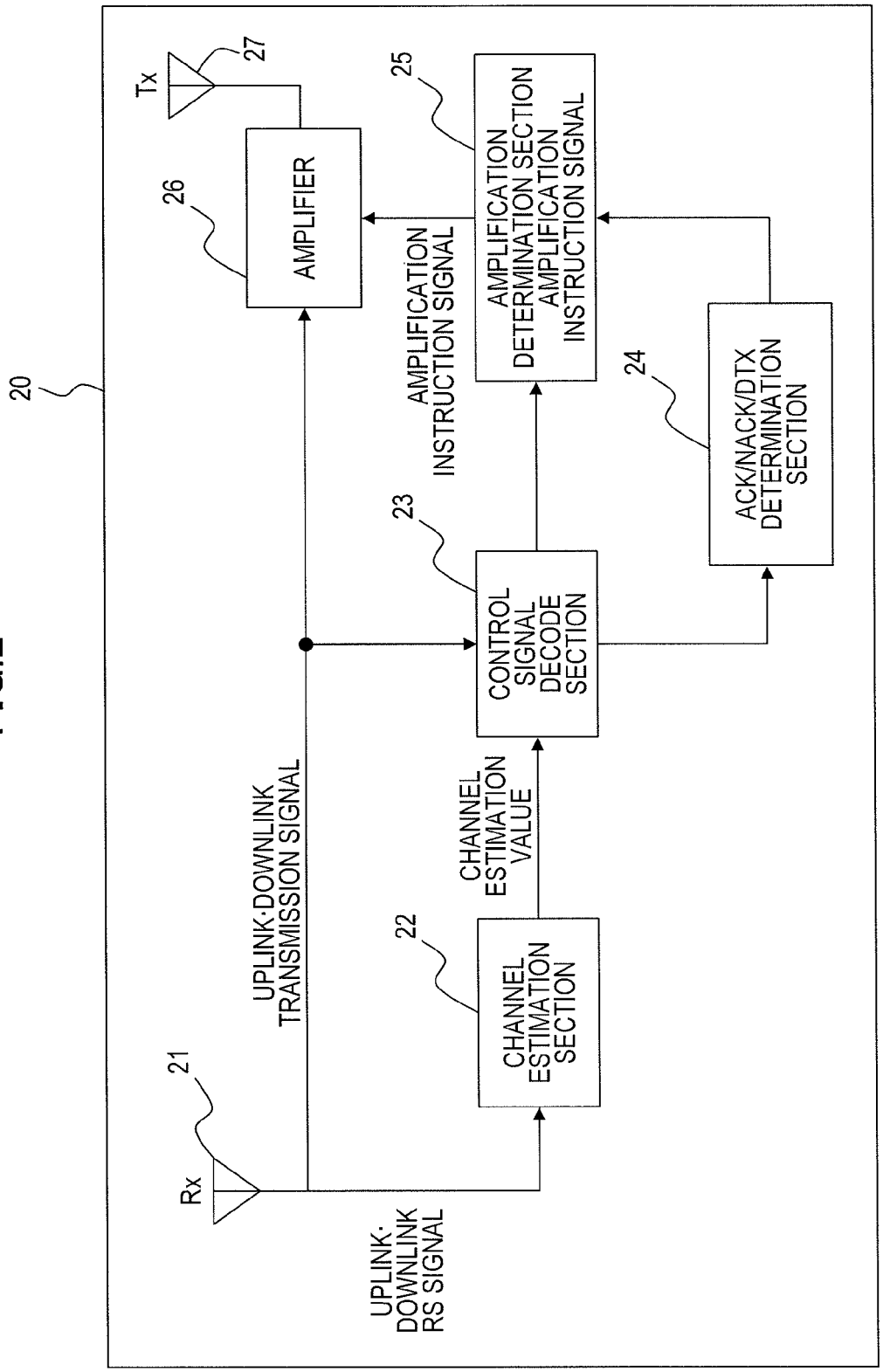
FIG. 2 is a diagram illustrating an example of a wireless relay device.

FIG. 2 is a diagram illustrating an example of the wireless relay device 20. The relay station 20 includes a reception antenna 21, a channel estimation section 22, a control signal decode section 23, an ACK/NACK/DTX (Acknowledgement/Negative Acknowledgement/Discontinuous Transmission) determination section (referred to as determination section) 24, an amplification determination section 25, an amplifier 26, and a transmission antenna 27.

The reception antenna 21 receives a signal transmitted from the base station 10 or the terminal 40.

The channel estimation section 22 performs channel estimation on a propagation channel between the base station 10 and the relay station 20 or between the relay station 20 and the terminal 40, based on an RS signal (or reference signal) included in a reception signal. The channel estimation section 22 outputs a channel estimation value to the control signal decode section 23.

The control signal decode section 23 demodulates and decodes a control signal included in the reception signal. The control signal decode section 23 retains scheduling information preliminarily received from the base station 10 and, based on the scheduling information, performs decoding or the like on the control signal included in the reception signal.

In addition, the control signal decode section 23 performs decoding or the like on an uplink control signal based on the channel estimation value for an uplink RS signal (an RS signal from the terminal 40 to the base station 10). In addition, the control signal decode section 23 performs decoding or the like on a downlink control signal based on the channel estimation value for a downlink RS signal (an RS signal from the base station 10 to the terminal 40). The control signal decode section 23 outputs the control signal subjected to decoding to the determination section 24.

Based on the control signal subjected to decoding, the determination section 24 determines whether retransmission control information included in the control signal corresponds to Acknowledgment (ACK), Negative Acknowledgment (NACK), or discontinuous transmission (DTX). ACK is, for example, a signal which indicates that the terminal 40 receives, without error, a data signal transmitted from the base station or the base station 10 receives, without error, a data signal transmitted from the terminal 40. NACK is, for example, a signal which indicates that the terminal 40 receives, with an error, a data signal transmitted from the base station 10 or the base station 10 receives, with an error, a data signal transmitted from the terminal 40. DTX is, for example, a signal which indicates that the terminal 40 or the base station 10 does not transmit a data signal or the like, namely, a non-transmission state. In this way, the determination section 24 determines the content of the retransmission control information and outputs the determination result to the amplification determination section 25.

When the determination result from the determination section 24 corresponds to NACK, the amplification determination section 25 outputs an amplification instruction signal to the amplifier 26 so that a retransmission signal based on the NACK is amplified by the amplifier 26 when the retransmission signal is relayed. The time taken for the retransmission signal to reach the relay station 20 after the relay station 20 receives NACK corresponds to, for example, T=4*TTI (2 ms) (Transmission Time Interval) approximately. On the other hand, a processing delay in the relay station 20 is at most several hundreds of milliseconds. Therefore, some time is taken for the retransmission signal to be transmitted. Accordingly, after NACK is input into the amplification determination section 25, the amplification determination section 25 outputs the amplification instruction signal to the amplifier 26. The amplifier 26 enters an on-state before a constant time τ elapses, and amplifies the retransmission data signal. The amplifier 26 enters an off-state again after the constant time τ elapses, and outputs the data signal to be relayed and the control signal to be relayed while the data signal and the control signal are not amplified. In addition, since, by receiving the determination result from the determination section 24, the amplification determination section 25 may detect whether the next data signal corresponding to the determination result is a new data signal or a retransmission data signal, the amplification determination section 25 may be seen, in other words, as a detection section used for detecting whether a data signal is a new data signal or retransmission data signal.

When the amplifier 26 receives the amplification instruction signal from the amplification determination section 25, the amplifier 26 amplifies the reception signal received by the reception antenna 21. For example, after the amplifier 26 receives the amplification instruction signal, the amplifier 26 enters an on-state during a certain period of time τ and amplifies the signal to be relayed. When the amplifier 26 does not receive the amplification instruction signal, the amplifier 26 outputs the reception signal without change to the transmission antenna 27.

The transmission antenna 27 transmits the reception signal, output from the amplifier 26, to the terminal 40 or the base station 10.

Figure 3:
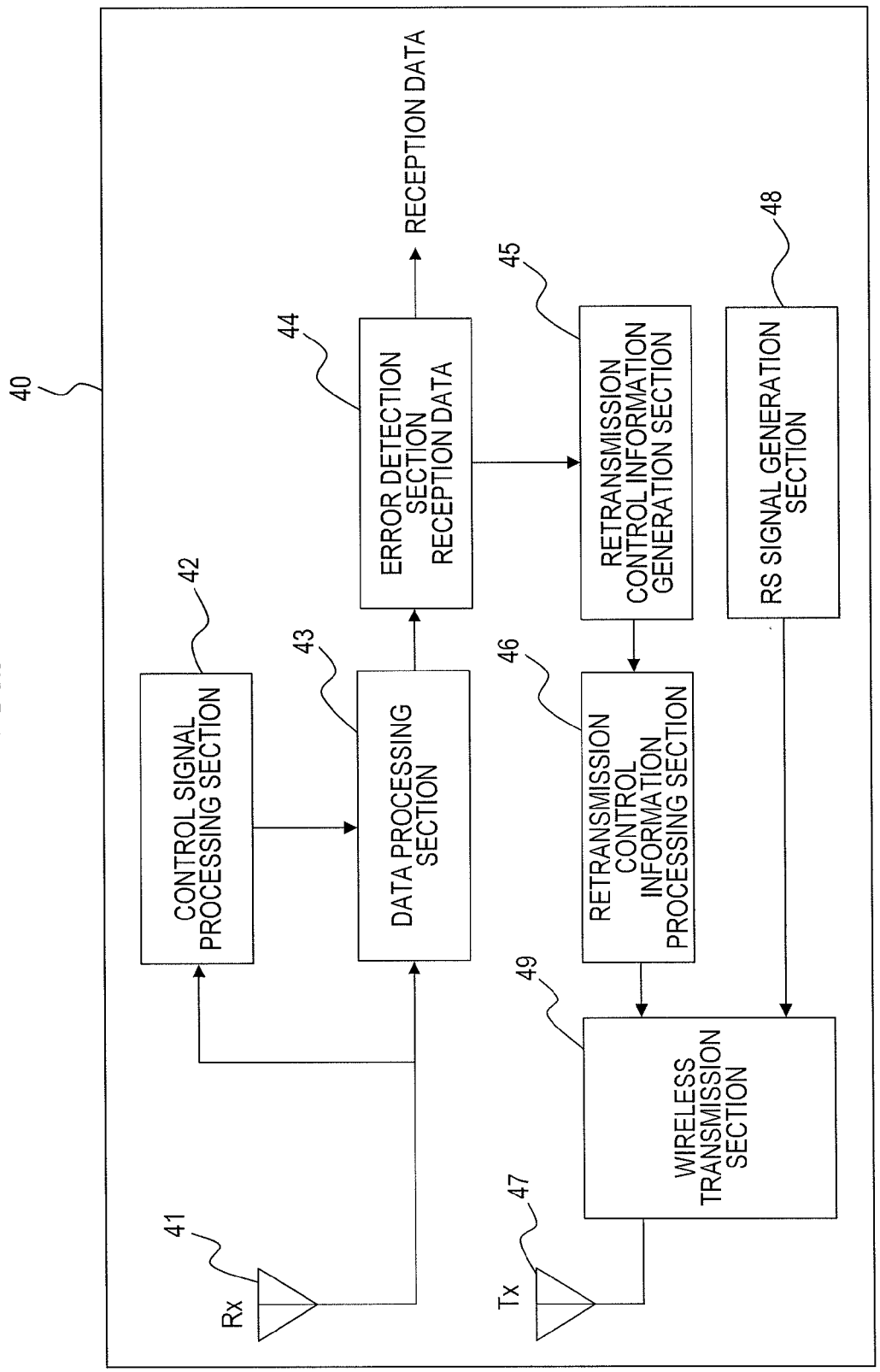
FIG. 3 is a diagram illustrating an example of a terminal device.

FIG. 3 is a diagram illustrating an example of the terminal device 40. The terminal 40 includes a reception antenna 41, a control signal processing section 42, a data processing section 43, an error detection section 44, a retransmission control information generation section 45, a retransmission control information processing section 46, a transmission antenna 47, an RS signal generation section 48, and a wireless transmission section 49.

The reception antenna 41 receives the transmission signal transmitted from the relay station 20.

Based on the scheduling information received preliminarily and retained, the control signal processing section 42 performs demodulation and decoding on the control signal included in the reception signal. The control signal processing section 42 outputs the control signal subjected to the processing to the data processing section 43.

Based on the control signal output from the control signal processing section 42, the data processing section 43 performs demodulation and decoding on the data signal included in the reception signal received from the base station 10 through the relay station 20. The control signal includes information relating to the scheduling information, a demodulation method, and a decoding method. Then, the data processing section 43 performs processing on the data signal based on the information.

The error detection section 44 detects whether or not there is an error in the data signal output from the data processing section 43. The error detection section 44 outputs the detection result to the retransmission control information generation section 45.

Based on the detection result from the error detection section 44, the retransmission control information generation section 45 generates the retransmission control information. For example, when the retransmission control information generation section 45 obtains the detection result which indicates there is no error from the error detection section 44, the retransmission control information generation section 45 generates ACK as the retransmission control information. Then, when the retransmission control information generation section 45 obtains the detection result which indicates there is error from the error detection section 44, the retransmission control information generation section 45 generates NACK as the retransmission control information.

The retransmission control information processing section 46 performs modulation and encoding on the retransmission control information output from the retransmission control information generation section 45 and outputs the retransmission control information as the control signal to the wireless transmission section 49.

The RS signal generation section 48 generates the RS signal and outputs the RS signal to the wireless transmission section 49.

The wireless transmission section 49 performs processing on the RS signal and the control signal so that the RS signal and the control signal are transmitted at a predetermined transmission power, for example. Then, the wireless transmission section 49 outputs the RS signal and the control signal to the transmission antenna 47.

The transmission antenna 47 transmits the control signal and the RS signal to the relay station 20.

Figure 4:
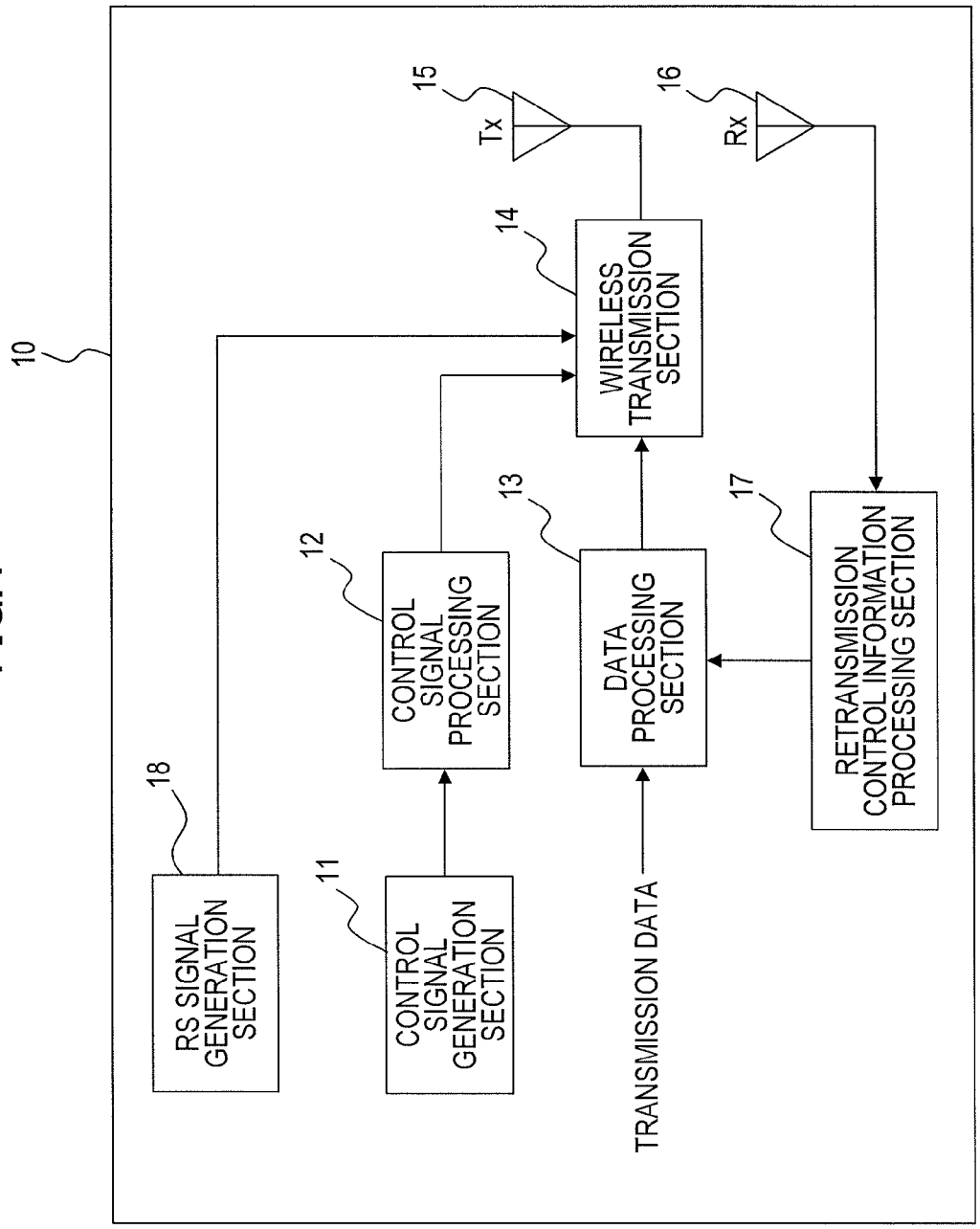
FIG. 4 is a diagram illustrating an example of a base station.

FIG. 4 is a diagram illustrating an example of the base station 10. The base station 10 includes a control signal generation section 11, a control signal processing section 12, a data processing section 13, a wireless transmission section 14, a transmission antenna 15, a reception antenna 16, a retransmission control information processing section 17, and an RS signal generation section 18.

The control signal generation section 11 generates the control signal including scheduling information.

The control signal processing section 12 performs encoding and modulation on the control signal and outputs the control signal to the wireless transmission section 14.

The data processing section 13 performs encoding and modulation on the data signal and outputs the data signal to the wireless transmission section 14. In addition, the data processing section 13 stores the data signal in a memory included in the data processing section 13. Then, when the data processing section 13 receives the retransmission control information including NACK from the retransmission control information processing section 17, the data processing section 13 outputs the data signal stored in the memory to the wireless transmission section 14. On the other hand, when the data processing section 13 receives the retransmission control information including ACK from the retransmission control information processing section 17, the data processing section 13 clears the data signal stored in the memory.

The wireless transmission section 14 performs processing on the control signal and the data signal so that the control signal and the data signal are transmitted at a certain transmission power, for example. Then, the wireless transmission section 14 outputs the control signal and the data signal to the transmission antenna 15. The control signal is transmitted, for example, before the data signal.

The transmission antenna 15 transmits the control signal and the data signal to the relay station 20.

The reception antenna 16 receives the control signal transmitted from the terminal 40 through the relay station 20.

The retransmission control information processing section 17 performs demodulation and decoding on the control signal and outputs the retransmission control information included in the control signal to the data processing section 13.

The RS signal generation section 18 generates the RS signal and outputs the RS signal to the wireless transmission section 14.

Figure 5:
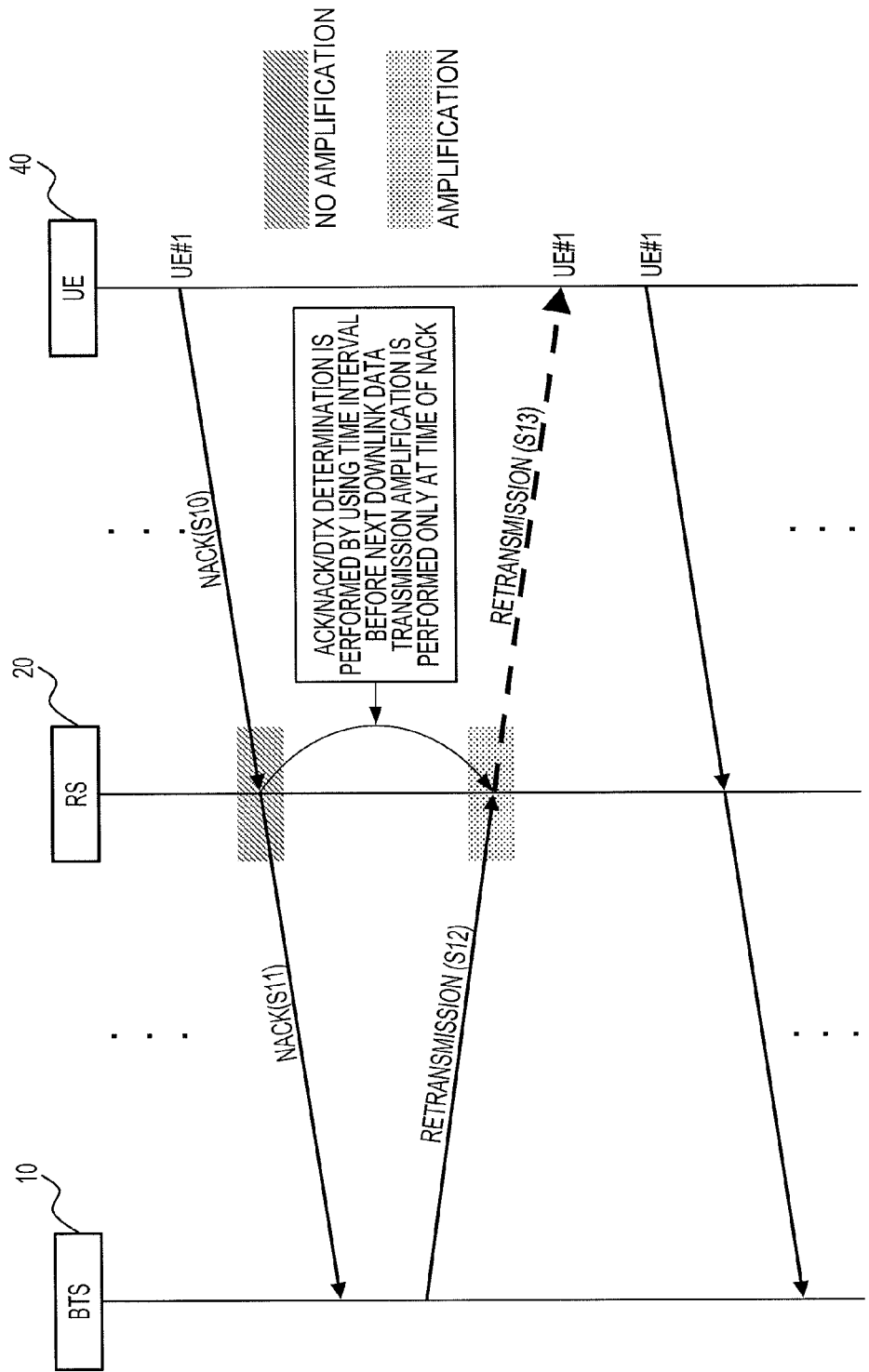
FIG. 5 is a sequence diagram illustrating a processing operation performed in a first embodiment.

Next, an operation will be described. FIG. 5 is a sequence diagram illustrating an example of a processing operation and the example in which NACK and the retransmission data signal are transmitted at uplink and downlink, respectively.

The terminal (UE#1) 40 receives the data signal from the base station (BTS) 10 through the relay station (RS) 20. The error detection section 44 in the terminal 40 detects an error in the received data signal and the terminal 40 transmits NACK as the retransmission control information (S10).

When the relay station 20 receives NACK, the relay station 20 relays and transmits the NACK to the base station 10 (S11). At this time, by using the time taken for the retransmission data signal corresponding to the NACK to be retransmitted from the base station 10, the relay station 20 performs processing such as processing for causing the amplifier 26 to enter an on-state, or the like so that the retransmission data signal is amplified at the time of retransmission.

Next, when the base station 10 receives NACK, the base station 10 retransmits the data signal corresponding to the NACK (S12).

The relay station 20 amplifies the retransmission data signal and transmits the retransmission data signal to the terminal 40 (S13). Since the terminal 40 receives the amplified retransmission data signal, the probability of receiving the retransmission data signal with no error may increase.

Figure 6:
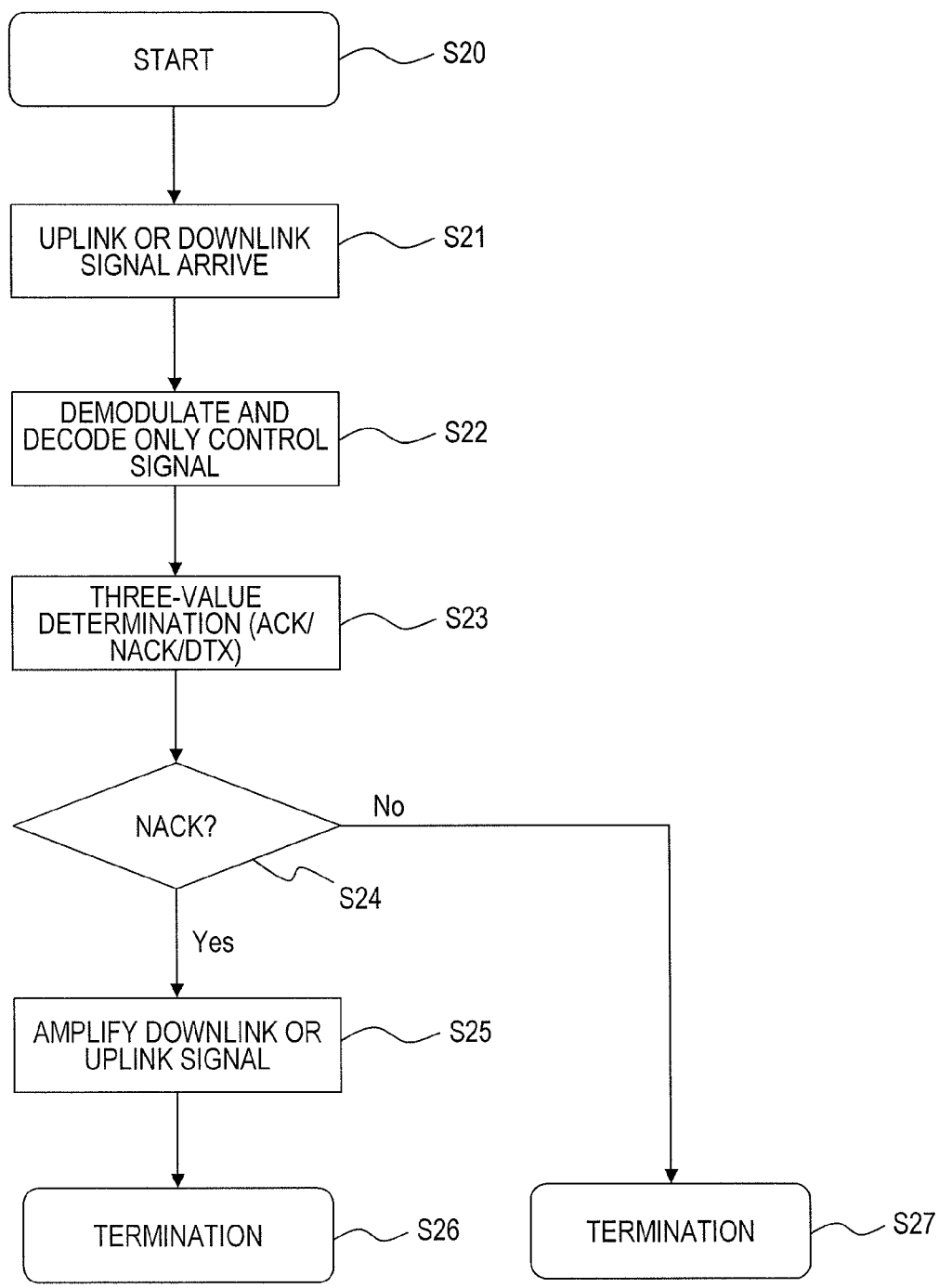
FIG. 6 is a flowchart illustrating a processing operation performed in a relay station in the first embodiment.

FIG. 6 is a flowchart illustrating an example of a processing operation performed in the relay station 20. The example illustrated in FIG. 6 includes an example of the case in which the retransmission signal is transmitted not only in at downlink but also at uplink.

When a processing operation is started (S20), the relay station 20 waits for the arrival of an uplink signal (transmission signal in a direction from the terminal 40 to the base station 10) or a downlink signal (transmission signal from the base station 10 to the terminal 40) (S21). Then, when the relay station 20 receives the uplink or downlink transmission signal, the control signal decode section 23 only demodulates and decodes the control signal (S22).

Next, the determination section 24 receives the control signal from the control signal decode section 23 and performs three-value determination based on the control signal (S23).

When the three-value determination result indicates that NACK is, as the retransmission control information, included in the control signal (Yes in S24), the relay station 20 amplifies the retransmission data signal for NACK (S25). For example, when the amplification determination section 25 obtains the determination result corresponding to NACK, the amplification determination section 25 outputs an amplification instruction signal to the amplifier 26. Based on the amplification instruction signal, for example, the amplifier 26 enters an on-state during the certain period of time τ and amplifies the downlink or uplink retransmission data signal. The amplifier 26 enters an off-state when the certain period of time τ elapses after, for example, the amplification.

Then, the relay station 20 terminates a series of processing operations (S26). Since the terminal 40 which receives the amplified data signal would more likely receive the data signal with no error, the probability of transmitting ACK may increase.

On the other hand, if the three-value determination result does not indicate a NACK signal (No in S24), the relay station 20 terminates a series of processing operations while not causing the amplifier 26 to enter an on-state (S27).

Figure 7:
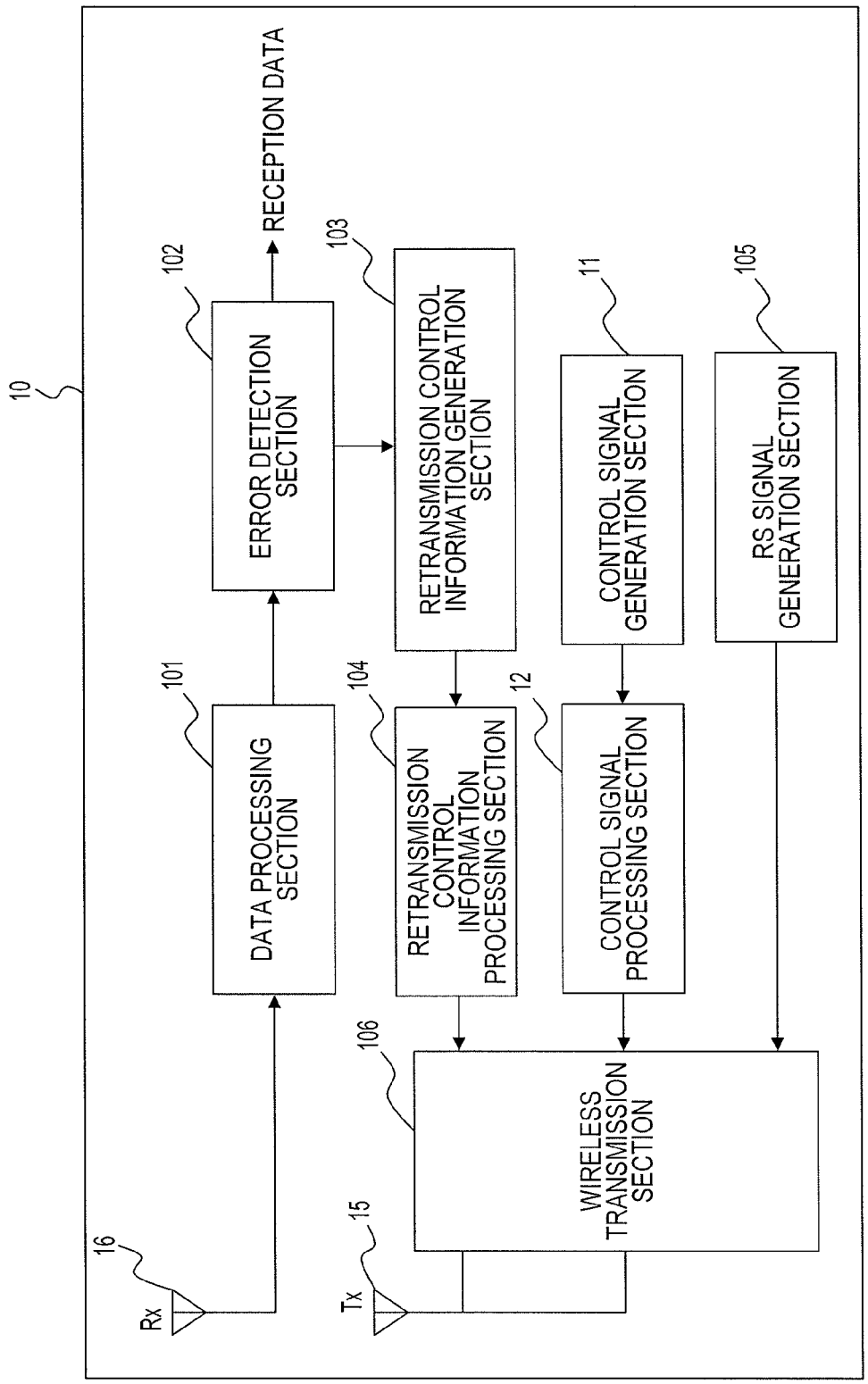
FIG. 7 is a diagram illustrating another example of the base station.
Figure 8:
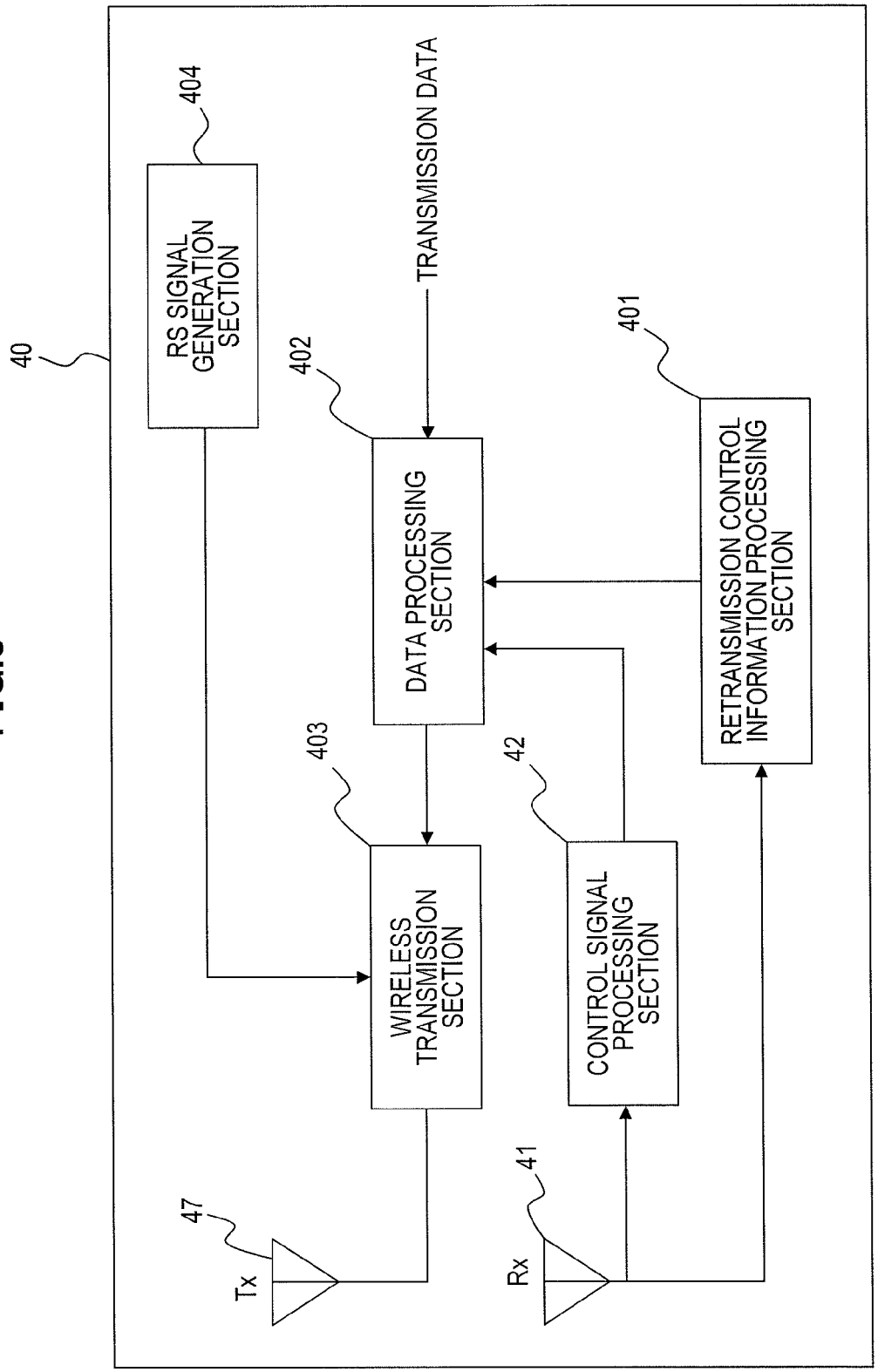
FIG. 8 is a diagram illustrating another example of the terminal device.

The example illustrated in FIG. 6 includes an example of the case in which the retransmission data signal for NACK is transmitted at uplink. In this case, the base station 10 performs error determination for the data signal transmitted from the terminal 40. Then, when the data signal is received erroneously, the base station 10 transmits NACK to the terminal 40. When the terminal 40 receives NACK, the terminal 40 retransmits the data signal. An example of the relay device 20 in this case is illustrated in FIG. 2, for example. Examples of the base station 10 and the terminal 40 are illustrated in FIGS. 7 and 8, respectively.

The base station 10 further includes a data processing section 101, an error detection section 102, a retransmission control information generation section 103, a retransmission control information processing section 104, an RS signal generation section 105, and a wireless transmission section 106.

The data processing section 101 performs demodulation and decoding or the like on the uplink data signal received from the terminal 40 through the relay station 20.

The error detection section 102 detects whether or not there is an error in the received data signal and outputs the detection result to the retransmission control information generation section 103.

The retransmission control information generation section 103 generates the retransmission control information based on the error detection result. The retransmission control information processing section 104 performs encoding or the like on the retransmission control information and outputs the retransmission control information, as the control signal, to the wireless transmission section 106.

In addition, the control signal generation section 11 generates the control signal which includes scheduling information or the like relating to an uplink signal.

In addition, the RS signal generation section 105 generates the RS signal and outputs the RS signal to the wireless transmission section 106.

The wireless transmission section 106 performs processing on the RS signal and the control signal so that the RS signal and the control signal are transmitted at a predetermined transmission power, for example. Then, the wireless transmission section 106 outputs the RS signal and the control signal to the terminal 40 through the transmission antenna 15.

As shown in FIG. 8, the terminal 40 may further include a retransmission control information processing section 401, a data processing section 402, a wireless transmission section 403, and an RS signal generation section 404.

The retransmission control information processing section 401 performs demodulation or the like on the retransmission control information transmitted from the base station 10.

When, for example, the retransmission control information output from the retransmission control information processing section 401 corresponds to NACK, the data processing section 402 performs encoding or the like on the data signal stored in a memory. Then, when the retransmission control information output from the retransmission control information processing section 401 corresponds to ACK, the data processing section 402 clears the data signal stored in a memory. In addition, based on an encoding rate or the like included in the control signal received through the control signal processing section 42, the data processing section 402 performs encoding and modulation or the like.

The RS signal generation section 404 generates the RS signal.

The wireless transmission section 403 performs amplification or the like on the retransmission data signal and the RS signal, output from the data processing section 402 and the RS signal generation section 404, respectively, and transmits the retransmission data signal and the RS signal to the base station 10 through the antenna 47.

In this way, in the first embodiment, the relay station 20 amplifies the retransmission data signal and does not amplify the data signal and the control signal other than the retransmission data signal. Accordingly, compared with the case in which amplification is performed constantly, the relay station 20 may reduce power consumption. In addition, since the relay station 20 performs demodulation or the like on the control signal and does not perform demodulation or the like on the data signal, the relay station 20 may reduce a processing delay, compared with the DF method. Furthermore, since the terminal 40 which has transmitted NACK receives the retransmission signal amplified by the relay station 20, the throughput of the terminal 40 which is located at a cell edge may be improved, for example.

<Second Embodiment>

Figure 9:
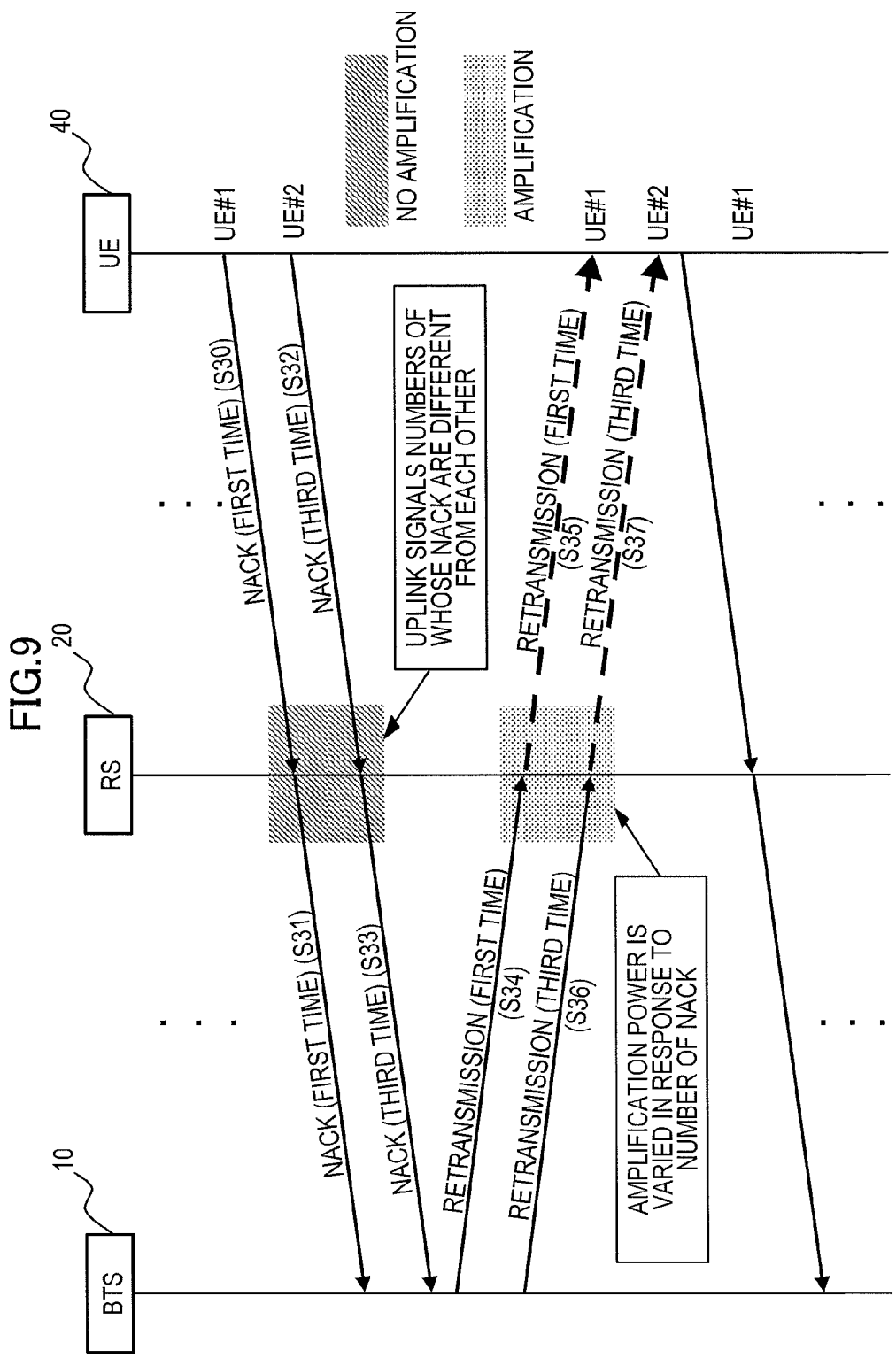
FIG. 9 is a sequence diagram illustrating a processing operation performed in a second embodiment.

Next, a second embodiment will be described. The second embodiment corresponds to an example in which amplification power is varied in response to the number of NACK. FIG. 9 is a diagram illustrating an example of sequence in the second embodiment.

Since the terminal (UE#1) 40-1 has detected an error in the data signal, the terminal (UE#1) 40-1 transmits the first NACK (S30). The relay station 20 relays and transmits the NACK, which is transmitted from the terminal (UE#1) 40-1, to the base station 10 (S31).

On the other hand, the terminal (UE#2) 40-2 also detects an error in the data signal and transmits the third NACK (S32). The relay station 20 relays and transmits the NACK, which is transmitted from the terminal (UE#2) 40-2, to the base station 10 (S33).

The base station 10 transmits, in reply to the NACK signals, the retransmission data signals to the relay station 20, respectively (S34 and S36).

Next, the relay station 20 relays the first retransmission data signal to the terminal (UE#1) 40-1. Then, since the number of reception of NACK is smaller than a threshold value (for example, 3 times), the relay station 20 transmits the first retransmission data signal without change in amplitude while not amplifying the first retransmission data signal (S35).

On the other hand, the relay station 20 relays the third retransmission data signal to the terminal (UE#2) 40-2. Then, since the number of reception of NACK is equal to or larger than the threshold value, the relay station 20 amplifies and transmits the third retransmission data signal (S37).

The example of the threshold value, illustrated in FIG. 9, is just an example and the threshold value may correspond to two times or more than three times. In addition, in the same way as the first embodiment, the second embodiment may be implemented similarly in the case in which the retransmission control information, such as NACK or the like, is transmitted from the base station 10 to the terminal 40 and the retransmission data signal is transmitted from the terminal 40 to the base station 10. In this case, the example of the relay station 20 is illustrated in FIG. 2 and the examples of the base station 10 and the terminal 40 are illustrated in FIGS. 7 and 8, respectively.

Figure 10:
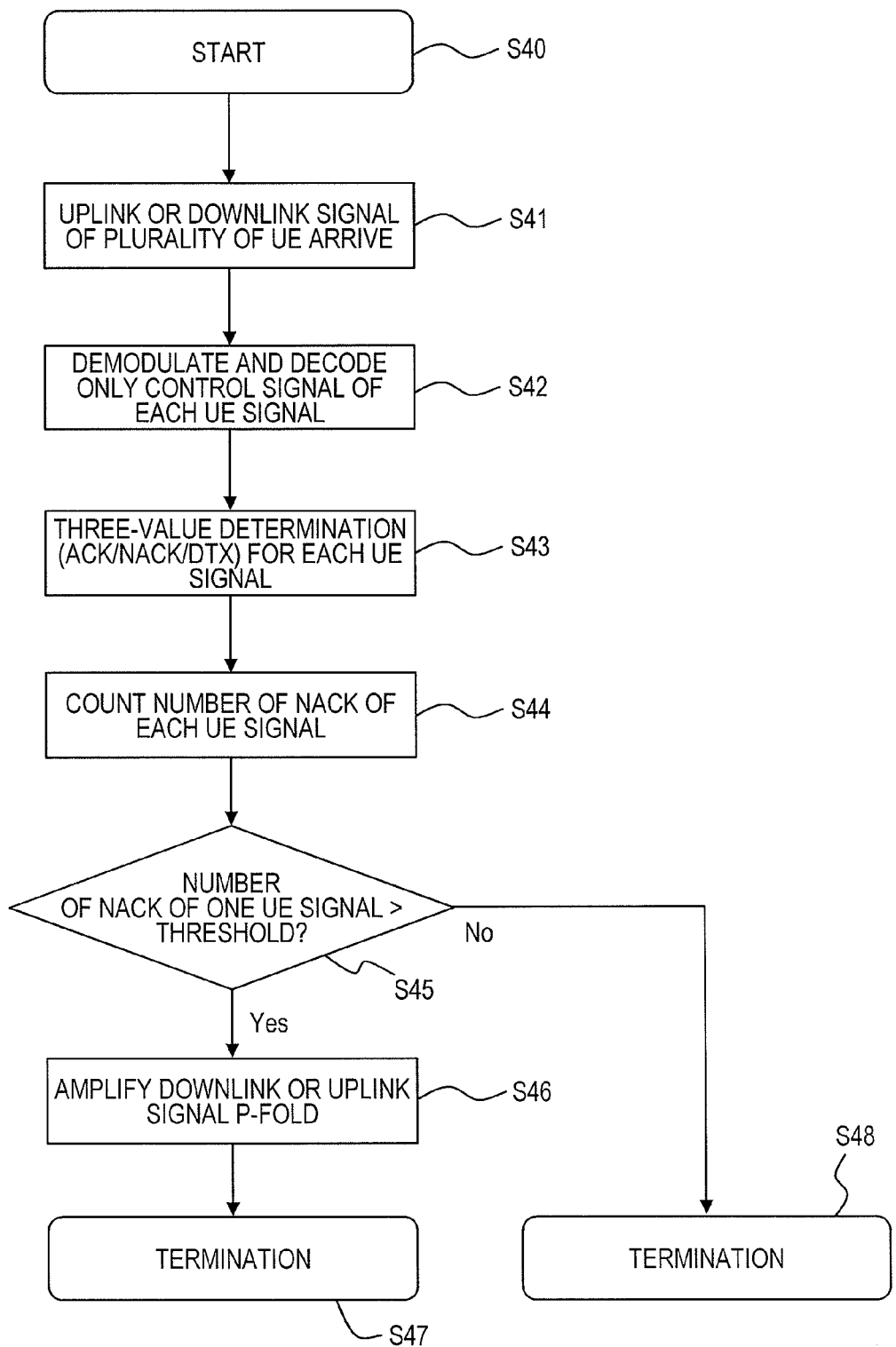
FIG. 10 is a flowchart illustrating a processing operation performed in a relay station in the second embodiment.

FIG. 10 is a flowchart illustrating a processing operation performed in the relay station 20 in the second embodiment. The example illustrated in FIG. 10 includes an example of the case in which the retransmission data is transmitted at both uplink and downlink.

When a processing operation is started (S40), the relay station 20 receives uplink signals from a plurality of the terminals 40 or a downlink signal from the base station 10 (S41).

Next, the relay station 20 demodulates and decodes the control signal included in the reception signal (S42). For example, demodulation is performed in the control signal decode section 23.

Next, the relay station 20 performs three-value determination for the individual terminals 40 based on the individual control signals (S43). For example, the determination section 24 performs the three-value determination.

Next, the relay station 20 counts the number of times when NACK is received from the individual terminals 40 (S44). For example, based on the determination results of NACK, supplied from the determination section 24, and the scheduling information or the like from the control signal decode section 23, the amplification determination section 25 counts the number of times when NACK is received from the individual terminals 40. For example, the scheduling information includes resource information (time domain and frequency band or the like) assigned to each of the terminals 40. Based on the resource included in the scheduling information and a reception frequency and reception timing of the received control signal, the amplification determination section 25 may determine which of the plurality of the terminals 40 has transmitted the control signal. For example, the amplification determination section 25 performs the determination by storing the number of NACK in a memory or the like.

Next, the relay station 20 determines whether or not the number of times when NACK is received from one of the plurality of the terminals 40 is larger than the threshold value (S45). For example, the amplification determination section 25 may preliminarily retain the threshold value and perform the determination by comparing the number of times when NACK is received from each terminal 40 with the threshold value.

When the number of times when NACK is received from one of the plurality of the terminals 40 is larger than the threshold value (Yes in S45), the relay station 20 amplifies the retransmission data signal corresponding to the NACK signal (S46). For example, the amplification determination section 25 puts the amplifier 26 into an on-state by outputting an amplification instruction signal to the amplifier 26 and the amplifier 26 amplifies the retransmission data signal. At this time, the relay station 20 may also vary amplification power (or amplification factor) of the amplifier 26 in response to the number of NACK reception. For example, the amplification determination section 25 outputs, as the amplification instruction signal, an amplification power value (or amplification factor) based on the number of NACK to the amplifier 26 and the amplifier 26 amplifies the retransmission data signal according to the amplification power value.

Next, the relay station 20 terminates a series of processing operations (S47).

On the other hand, when the number of times when NACK is received from one of the plurality of the terminals 40 is equal to or smaller than the threshold value (No in S45), the relay station 20 terminates a series of processing operations while not putting the amplifier 26 into an on-state (S48).

In this way, in the second embodiment, since the relay station 20 may put an amplification operation of the amplifier 26 into an on-state or an off-state according to the number of reception of NACK and furthermore vary amplification power, it is more likely that the terminals 40 and the base station 10 may receive the retransmission data signals without error and transmit ACK signals, compared with the first embodiment.

<Third Embodiment>

Next, a third embodiment will be described. The third embodiment corresponds to an example, in which the relay station 20 comprehensively evaluates a three-value determination result and determines whether or not amplification is performed, when the relay station 20 receives pieces of the retransmission control information from a plurality of the terminals 40.

Figure 11:
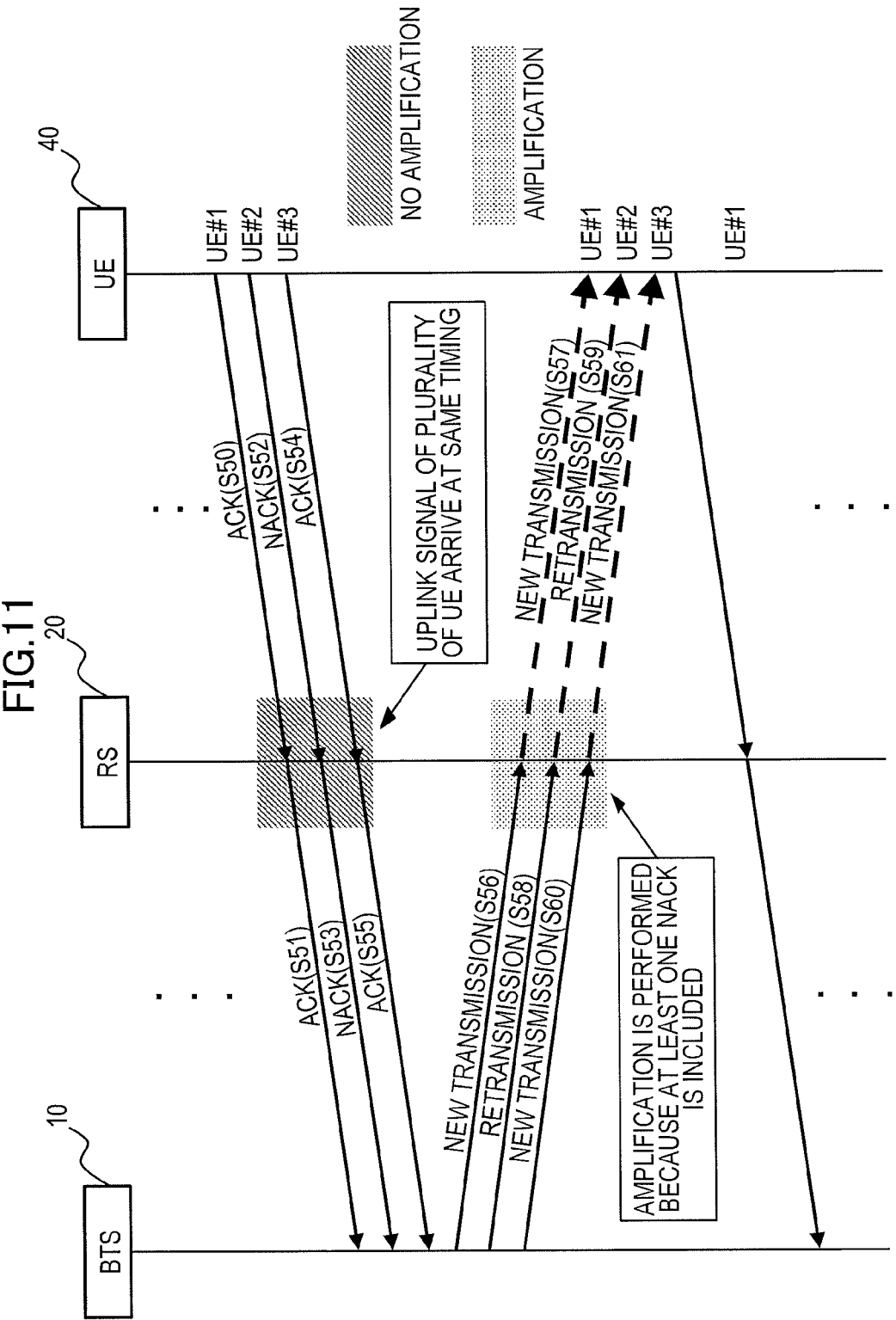
FIG. 11 is a sequence diagram illustrating a processing operation performed in a third embodiment.

FIG. 11 is a diagram illustrating an example of a sequence in the third embodiment. A plurality of terminals (UE#1 to UE#3) 40-1 to 40-3 transmit control signals ACK, NACK, and ACK at the same timing (or during a predetermined time period), respectively (S50, S52, and S54).

Next, the relay station 20 relays individual signals such as ACK and NACK or the like transmitted from the terminals (UE#1 to UE#3) 40-1 to 40-3 and transmits the signals to the base station 10 (S51, S53, and S55).

Next, the base station 10 transmits new data signals to the terminals (UE#1 and UE#3) 40-1 and 40-3 which have transmitted ACK (S56 and S60) and transmits the retransmission data signal to the terminal (UE#2) 40-2 which has transmitted NACK (S58).

Next, the relay station 20 relays the new data signals and the retransmission data signal (S57, S59, and S61). At the time that the relay station 20 relays the three pieces of the retransmission control information at the same timing (S51, S53, and S55), since at least one NACK is included in the three pieces of the retransmission control information, the relay station 20 amplifies all the next downlink data signals corresponding to the three pieces of the retransmission control information.

The terminals (UE#1 to UE#3) 40-1 to 40-3 receive the amplified data signals, respectively, independently of new transmission and retransmission.

The example illustrated in FIG. 11 is an example in which the retransmission control information is transmitted at uplink and the retransmission data signal is transmitted at downlink. However, in the same way as the first embodiment, the example illustrated in FIG. 11 may also be implemented in the case in which the retransmission control information is transmitted at downlink and the retransmission data signal is transmitted at uplink. In this case, the example of the relay station 20 is illustrated in FIG. 2 and the examples of the base station 10 and the terminal 40 are illustrated in FIGS. 7 and 8, respectively.

Figure 12:
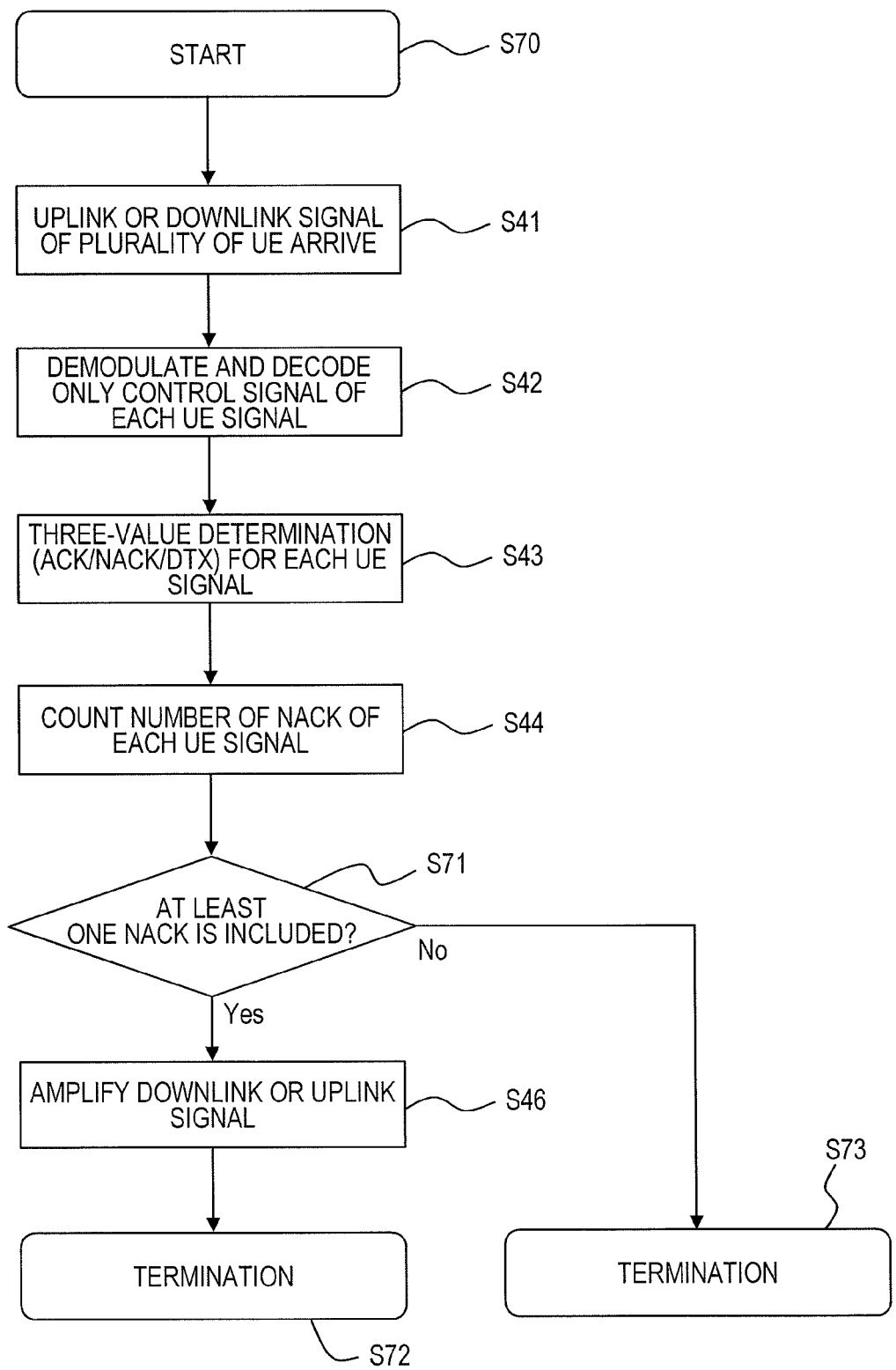
FIG. 12 is a flowchart illustrating a processing operation performed in a relay station in the third embodiment.

FIG. 12 is a flowchart illustrating an example of a processing operation performed in the relay station 20. The example includes the case in which the retransmission data signals are transmitted at uplink and downlink.

When a processing operation is started (S70), the relay station 20 performs processing operations S41 to S44 in the same way as in the second embodiment.

Next, when at least one NACK is included in pieces of the retransmission control information received at the same timing (or during a predetermined period) (Yes in S71), the relay station 20 amplifies the next downlink data signals (S46) and terminates a processing operation (S72). On the other hand, when all the pieces of the retransmission control information correspond to ACK (No in S71), the relay station 20 terminates a processing operation while not amplifying the downlink data signals (S73).

For example, at the time that the amplification determination section 25 in the relay station 20 receives a plurality of pieces of the retransmission control information during a time period, when at least one NACK is included in the plurality of pieces of the retransmission control information, the amplification determination section 25 outputs an amplification instruction signal to the amplifier 26. Accordingly, the amplifier 26 enters an on-state during a certain period of time τ and may amplify all the next downlink data signals corresponding to the plurality of pieces of the retransmission control information. On the other hand, when the amplification determination section 25 receives the plurality of pieces of the retransmission control information during a time period and all the plurality of pieces of retransmission control information correspond to ACK, the amplification determination section 25 does not output the amplification instruction signal. In this case, the amplifier 26 enters an off-state and may relay a data signal while not amplifying the data signal. The amplifier 26 enters an off-state after the certain period of time τ elapses, in the same way as the first and the second embodiments.

Figure 13:
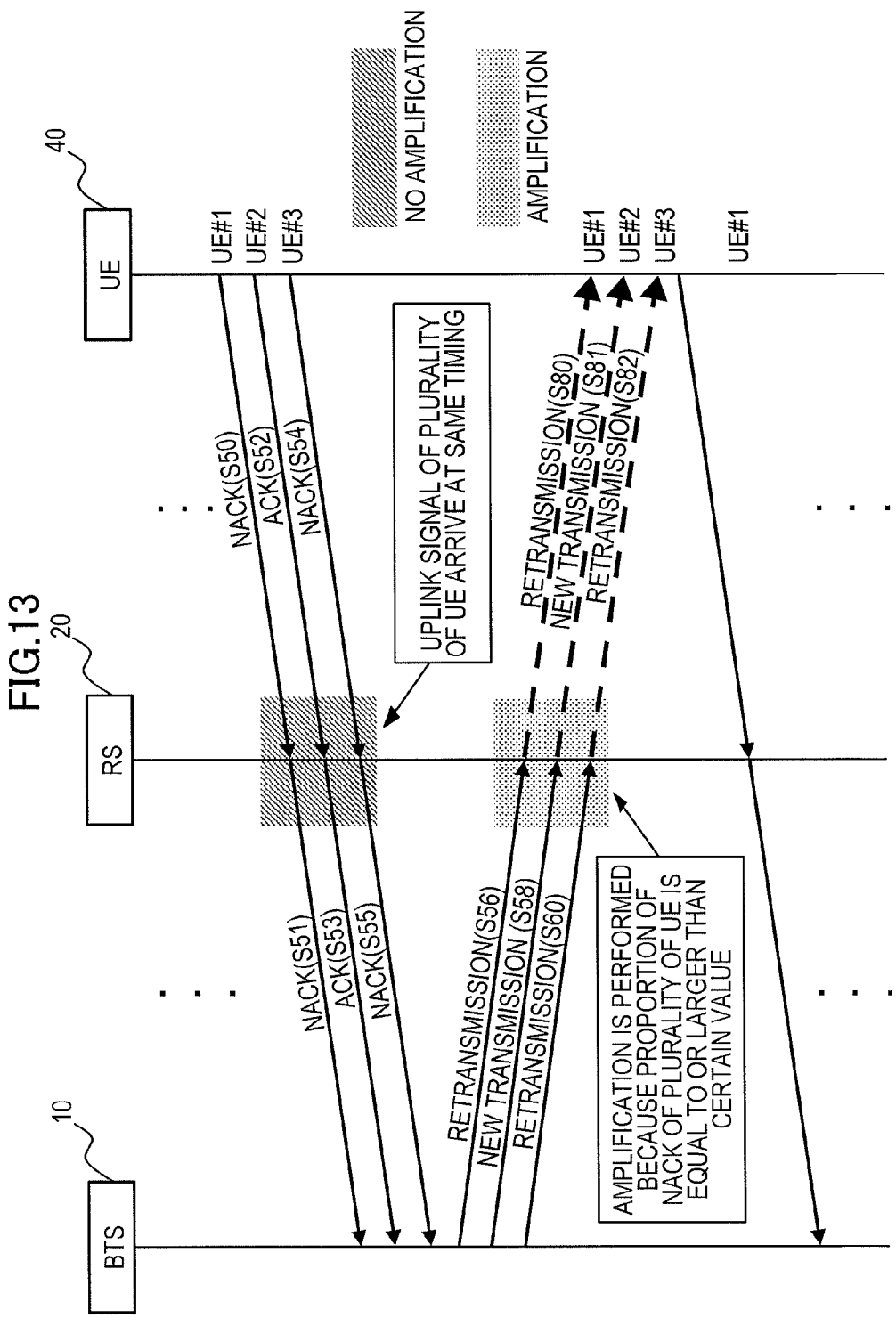
FIG. 13 is a sequence diagram illustrating another example of the processing operation performed in the third embodiment.

FIG. 13 is a sequence diagram illustrating another example of the third embodiment. The relay station 20 receives pieces of the retransmission control information at the same timing (or during a certain time period). However, in the example, when a proportion of NACK in the pieces of the retransmission control information received at the same timing is larger than a threshold value, the relay station 20 amplifies all the next downlink data signals corresponding to the pieces of the retransmission control information (S80 to S82). In the same way as the first embodiment, the example may be implemented in the case in which the retransmission control information is transmitted at downlink and the retransmission data signal is transmitted at uplink.

Figure 14:
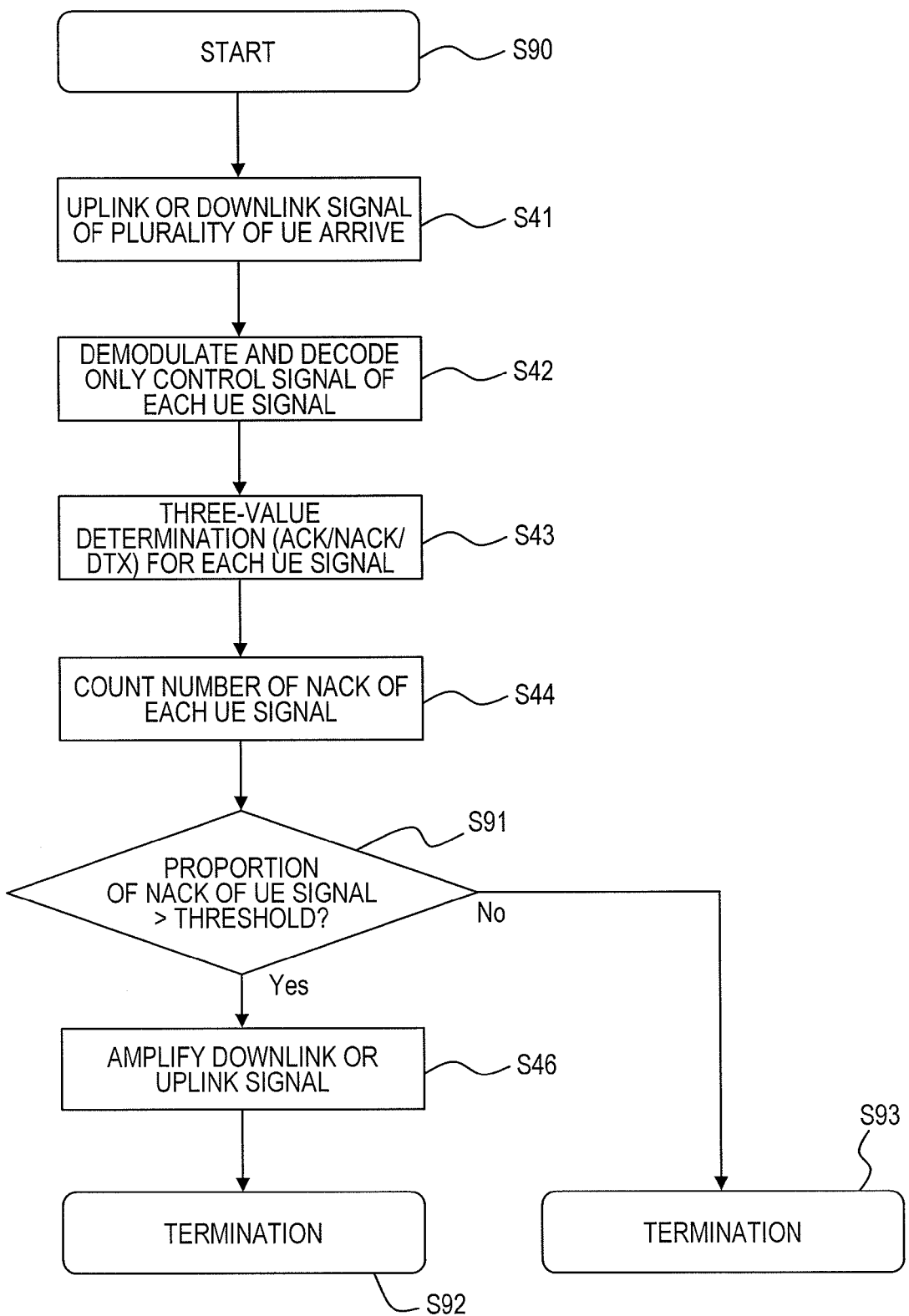
FIG. 14 is a flowchart illustrating another example of the processing operation performed in the relay station in the third embodiment.

FIG. 14 is a flowchart illustrating an example of a processing operation performed in the relay station 20. When a processing operation is started (S90), the relay station 20 performs processing operations S41 to S44 in the same way as in the second embodiment.

Next, the relay station 20 compares the proportion of received NACK with the threshold value (S91). For example, during a time period, the amplification determination section 25 retains the number of all the pieces of the received retransmission control information and the number of NACK and calculates the proportion of NACK in the number of all the pieces of the retransmission control information. Then, the amplification determination section 25 may perform processing by comparing the proportion with the threshold value preliminarily retained.

When the proportion of NACK is larger than the threshold value (Yes in S91), the relay station 20 amplifies all the next data signal corresponding to the pieces of the retransmission control information (S46). For example, when the proportion of NACK is larger than the threshold value, the amplification determination section 25 outputs an amplification instruction signal to the amplifier 26. The amplifier 26 enters an on-state during the certain period of time τ and amplifies and outputs the retransmission data signal corresponding to the NACK or the like.

Then, the relay station 20 terminates a series of processing operations (S92).

On the other hand, when the proportion of NACK is equal to or smaller than the threshold value (No in S91), the relay station 20 terminates a series of processing operations while not amplifying the data signal or the like (S93).

In this way, in the third embodiment, even when the relay station 20 receives the pieces of the retransmission control information at the same timing (or during a certain time period) from the plurality of the terminals 40, the relay station 20 does not perform demodulation on the data signals corresponding to the pieces of the retransmission control information. Therefore, a processing delay may be reduced, compared with the DF method.

<Another Embodiment>

Figure 15:
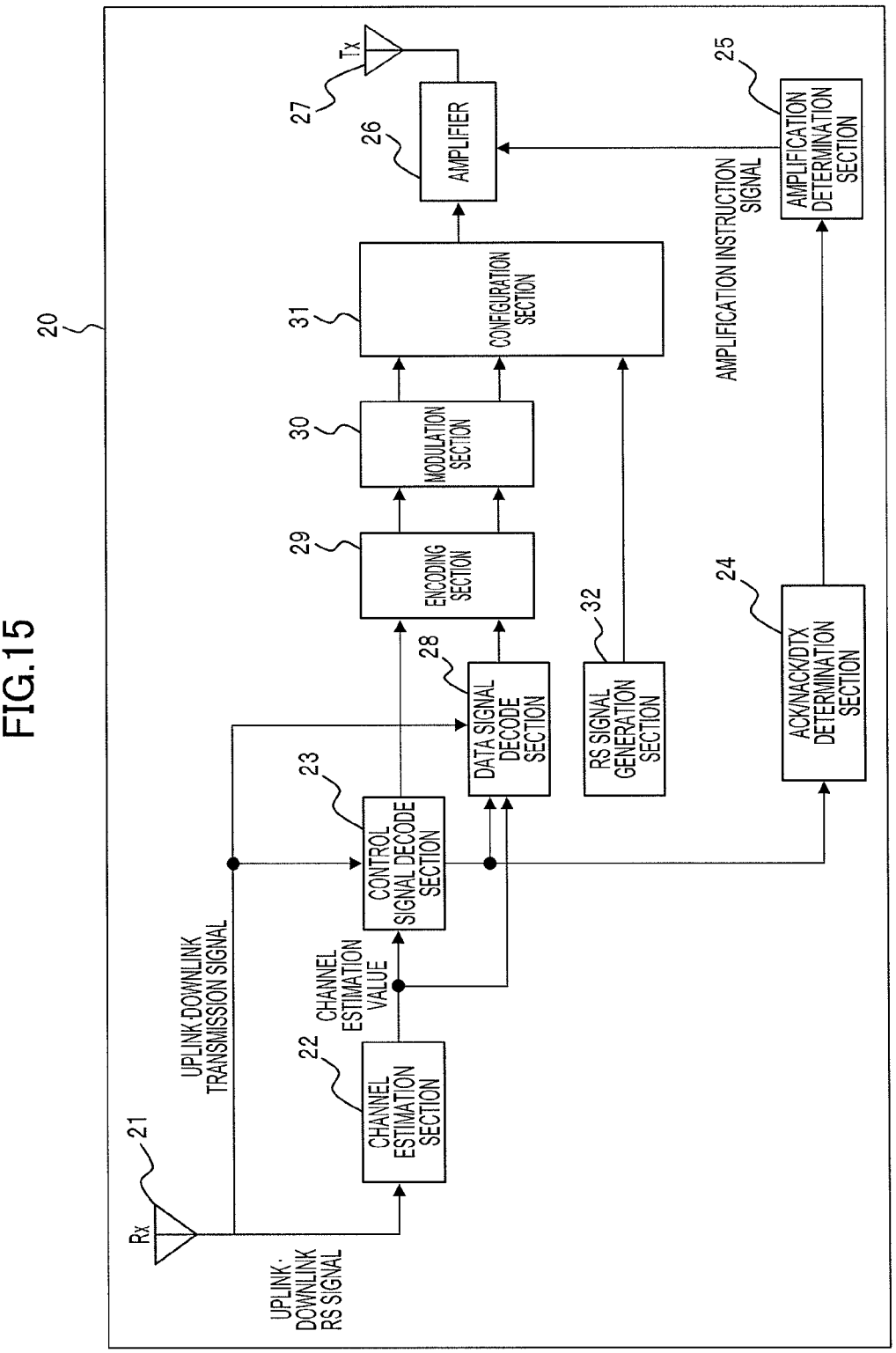
FIG. 15 is a diagram illustrating another example of the wireless relay device.

Next, another embodiment will be described. FIG. 15 is a diagram illustrating another example of the relay device 20. The relay station 20 further includes a data signal decode section 28, an encoding section 29, a modulation section 30, a configuration section 31, and an RS signal generation section 32.

The data signal decode section 28 performs decoding and demodulation on the data signal based on the control signal received from the control signal decode section 23. Furthermore, when there is an error in the data signal, the data signal decode section 28 performs error correction.

The encoding section 29 encodes the control signal from the control signal decode section 23 and the data signal from the data signal decode section 28.

The modulation section 30 modulates an output from the encoding section 29.

The configuration section 31 configures a frame by using the data signal and the control signal, output from the modulation section 30, and the RS signal (reference signal) output from the RS signal generation section 32, and outputs the frame.

In the same way as the first embodiment, when the relay station 20 illustrated in FIG. 15 detects NACK, the relay station 20 also amplifies the corresponding retransmission data signal. Then, other than in this condition, the relay station 20 does not amplify the corresponding retransmission data signal. Accordingly, compared with the case in which amplification is performed constantly, the relay station 20 may reduce power consumption.

In addition, compared with the relay station 20 in the first embodiment, since the relay station 20 in the third embodiment performs error correction, the reception characteristic of a receiving side (the terminal 40 or the base station 10) may be improved.

In addition, the relay station 20 in the third embodiment may also vary power amplification in response to the number of NACK (according to the second embodiment), and perform amplification whenever there is NACK in a plurality of pieces of the received retransmission control information or perform amplification when the proportion of NACK is a certain value (according to the third embodiment).

In the first embodiment or the like, there is described the case in which the amplification determination section 25 outputs the amplification instruction signal when the amplification determination section 25 obtains the determination result corresponding to NACK or the like from the determination section 24. For example, when a constant time κ (<τ) elapses after the amplification determination section 25 obtains the determination result corresponding to NACK or the like, the amplification determination section 25 may output the amplification instruction signal to the amplifier 26. After the amplifier 26 receives the amplification instruction signal, the amplifier 26 may amplify the retransmission data signal. After that, the amplifier 26 enters an off-state and outputs the reception signal while not amplifying the reception signal.

In addition, in the first embodiment or the like, there is described the case in which the amplifier 26 enters an on-state during the certain period of time τ after receiving the amplification instruction signal and the amplifier 26 amplifies the reception signal. For example, the amplification determination section 25 receives the control signal from the control signal decode section 23 and determines from which of the terminals 40 and the base station 10 the data signal is received, based on the scheduling information or the like included in the control signal. Accordingly, the amplification determination section 25 may also determine whether or not the reception signal is the retransmission data signal corresponding to NACK. When the amplification determination section 25 determines that the reception signal is the retransmission data signal, the amplification determination section 25 outputs the amplification instruction signal in the same way as in the first embodiment. The amplifier 26 may amplify the retransmission signal based on the amplification instruction signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that various changes, substitutions, and alterations could be made hereto without departing from the spirit and scope of the invention.

The invention claimed is:

1. A wireless relay device comprising:
 a processor configured to determine whether or not a reception signal transmitted from a transmission device is a retransmission signal retransmitted from the transmission device; and
 an amplifier configured to amplify the reception signal for transmitting to a reception device according to the determination of the reception signal, wherein
 the processor performs the determination based on retransmission control information transmitted from the reception device, and
 the retransmission control information indicates one of ACK (Acknowledgement), DTX (Discontinuous Transmission), and NACK (Negative Acknowledgement), based upon which the processor determines whether or not the reception signal transmitted from the transmission device is a retransmission signal.

2. The wireless relay device according to claim 1, wherein when the retransmission control information indicates ACK (Acknowledgement) or DTX (Discontinuous Transmission), the processor determines that the reception signal is not the retransmission signal.

3. The wireless relay device according to claim 1, wherein when the retransmission control information indicates NACK (Negative Acknowledgement), the processor determines that the reception signal is the retransmission signal.

4. The wireless relay device according to claim 1, wherein the processor includes a counter configured to count a number of times the processor determines that the retransmission control information indicates NACK (Negative Acknowledgement),
 wherein the amplifier amplifies the reception signal when a count value of the counter exceeds a threshold value.

5. The wireless relay device according to claim 1, wherein the processor inputs a plurality of pieces of the retransmission control information, transmitted from a plurality of the reception devices, during a certain period of time; and
 the amplifier amplifies the reception signal when it is determined that
 at least one of the plurality of pieces of the retransmission control information, which indicates NACK (Negative Acknowledgement), is received.

6. The wireless relay device according to claim 1, wherein the processor inputs a plurality of pieces of the retransmission control information, transmitted from a plurality of the reception devices, during a certain period of time; and
 the amplifier amplifies the reception signal when a proportion of the retransmission control information that indicates NACK among a total amount of the input retransmission control information is larger than a threshold value.

7. The wireless relay device according to claim 1, wherein the amplifier amplifies the reception signal by entering an on-state during a certain time period, when it is determined that the reception signal is the retransmission signal.

8. The wireless relay device according to claim 1, wherein the transmission device is a base station, and the reception device is a terminal device.

9. The wireless relay device according to claim 1, wherein the transmission device is a terminal device, and the reception device is a base station.

10. A wireless relay method performed in a wireless relay device, the wireless relay method comprising:
 determining whether or not a reception signal transmitted from a transmission device is a retransmission signal retransmitted from the transmission device; and
 amplifying the reception signal for transmitting to a reception device according to the determining of the reception signal, wherein
 the determining is based on retransmission control information transmitted from the reception device. and
 the retransmission control information indicates one of ACK (Acknowledgement), DTX (Discontinuous Transmission), and NACK (Negative Acknowledgement), based upon which it is determined whether or not the reception signal transmitted from the transmission device is a retransmission signal.

11. A wireless communication system comprising:
 a transmission device;
 a wireless relay device; and
 a reception device;
 wherein
 the transmission device includes a transmitter configured to transmit a transmission signal;
 the wireless relay device includes
 a processor configured to receive the transmission signal transmitted from the transmission device and determine whether or not the transmission signal is a retransmission signal retransmitted from the transmission device, and
 an amplifier configured to amplify the transmission signal for transmitting to the reception device according to the determination of the transmission signal; and
 the reception device includes a receiver configured to receive the amplified transmission signal, wherein
 the processor performs the determination based on retransmission control information transmitted from the reception device, and
 the retransmission control information indicates one of ACK (Acknowledgement), DTX (Discontinuous Transmission), and NACK (Negative Acknowledgement), based upon which the processor determines whether or not the reception signal transmitted from the transmission device is a retransmission signal.

12. The wireless relay device according to claim 1, wherein the amplifier is configured to amplify the reception signal when the processor determines that the reception signal is the retransmission signal, and not to amplify the reception signal when the processor determines that the reception signal is not the retransmission signal.

13. The wireless relay method according to claim 10, wherein the amplifying amplifies the reception signal when the determining determines that the reception signal is the retransmission signal, and does not amplify the reception signal when the determining determines that the reception signal is not the retransmission signal.

14. The wireless communication system according to claim 11, wherein
the amplifier is configured to amplify the transmission signal when the processor determines that the transmission signal is the retransmission signal, and not to amplify the transmission signal when the processor determines that the reception signal is not the retransmission signal.

* * * * *